United States Patent
Bartminn et al.

(10) Patent No.: US 11,448,192 B2
(45) Date of Patent: Sep. 20, 2022

(54) SUPPORT STRUCTURE FOR A WIND TURBINE

(71) Applicants: Daniel Bartminn, Elmshorn (DE); Artur Czarnecki, Hamburg (DE); Benjamin Matlock, Hamburg (DE)

(72) Inventors: Daniel Bartminn, Elmshorn (DE); Artur Czarnecki, Hamburg (DE); Benjamin Matlock, Hamburg (DE)

(73) Assignee: RWE Renewables GmbH, Essen (DE)

( * ) Notice: Subject to any disclaimer, the term of this patent is extended or adjusted under 35 U.S.C. 154(b) by 0 days.

(21) Appl. No.: 17/375,528

(22) Filed: Jul. 14, 2021

(65) Prior Publication Data

US 2021/0340958 A1 Nov. 4, 2021

Related U.S. Application Data (63) Continuation of application No. PCT/EP2019/086234, filed on Dec. 19, 2019.

(30) Foreign Application Priority Data

Jan. 18, 2019 (DE) ...................... 10 2019 101 330.5

(51) Int. Cl.
*F03D 13/10* (2016.01)
*E04H 12/08* (2006.01)
(Continued)

(52) U.S. Cl.
CPC .............. *F03D 13/10* (2016.05); *B21C 37/08* (2013.01); *E04C 3/30* (2013.01); *E04H 12/08* (2013.01);
(Continued)

(58) Field of Classification Search
CPC ....... E04H 12/08; E04H 12/085; E04H 12/34; B21C 37/08; E02D 5/285; F03D 13/10; E04C 3/30; F05B 2230/232
See application file for complete search history.

(56) References Cited

U.S. PATENT DOCUMENTS 6,715,243 B1 * 4/2004 Fons ......................... E04H 7/30
220/4.12
10,794,031 B2 * 10/2020 Matlock .................. E02D 5/285
(Continued)

FOREIGN PATENT DOCUMENTS

DE 10 2016 203 268 A1 8/2017
DE 10 2016 205 447 A1 10/2017
(Continued)

OTHER PUBLICATIONS

"Schweißen und verwandte Prozesse—Symbolische Darstellung in Zeichnungen Schweißverbindungen (ISO 2553:2013); Deutsche Fassung EN ISO 2553:2013." International Organization for Standardization, Apr. 2014, 70 pages. Retrieved Apr. 4, 2019. URL:http://perinom/Perinorm-Volltexte/2016-11_Grunbestand/CD21DE_05/2064089/2064089.pdf?.

*Primary Examiner* — Andrew J Triggs
(74) *Attorney, Agent, or Firm* — Reinhart Boerner Van Deuren P.C.

(57) ABSTRACT

Supporting structure, in particular for a wind power plant, having at least two sub-segments which are at least partially connected to one another and are respectively formed from a metal plate having a longitudinal extent and a width extent. The longitudinal extent being greater than the width extent, and the sub-segments each having longitudinal edges extending in longitudinal extent and being connected to one another at mutually abutting joint surfaces along the longitudinal edges by a welded joint respectively. The sub-segments respectively have end edges extending in width,
(Continued)

the sub-segments being bent along their end edges respectively. The respective welded joint has in sections a thickness which is smaller than a wall thickness of the metal plate and in sections a thickness which corresponds at least to the wall thickness of the metal plate.

20 Claims, 5 Drawing Sheets

(51) Int. Cl.
    *E04C 3/30*     (2006.01)
    *E04H 12/34*     (2006.01)
    *B21C 37/08*     (2006.01)
    *F03D 13/20*     (2016.01)

(52) U.S. Cl.
    CPC ............ *E04H 12/085* (2013.01); *E04H 12/34* (2013.01); *F03D 13/22* (2016.05); *F05B 2230/232* (2013.01)

(56) References Cited

U.S. PATENT DOCUMENTS

| | | | |
|---|---|---|---|
| 11,053,703 B2* | 7/2021 | Bartminn | ................ F03D 13/20 |
| 2007/0294955 A1* | 12/2007 | Sportel | ................... F03D 13/10 52/40 |
| 2019/0071833 A1 | 3/2019 | Matlock | |
| 2021/0340958 A1* | 11/2021 | Bartminn | ................ F03D 13/10 |

FOREIGN PATENT DOCUMENTS

| | | |
|---|---|---|
| JP | 2011-115829 A | 6/2011 |
| JP | 2019-512628 A | 5/2019 |
| WO | WO 2011/099915 A1 | 8/2011 |
| WO | WO 2012/128693 A1 | 9/2012 |
| WO | WO 2017/167990 A1 | 10/2017 |

\* cited by examiner

SUPPORT STRUCTURE FOR A WIND TURBINE

CROSS-REFERENCE TO RELATED PATENT APPLICATIONS

This patent application is a continuation of International Application No. PCT/EP2019/086234, filed on Dec. 19, 2019, which claims the benefit of priority to German Patent Application No. 10 2019 101 330.5, filed Jan. 18, 2019, the entire teachings and disclosures of both applications are incorporated herein by reference thereto.

FIELD OF THE INVENTION

The subject matter relates to a support structure, in particular for a wind power plant. Such a support structure may be part of a tubular foundation pile of a plant, in particular of a wind power plant.

BACKGROUND OF THE INVENTION

From the prior art, it is known to construct support structures, e.g. foundation piles, from support structure segments arranged one above the other and connected to each other. The support structure segments are in turn assembled from one, two or more sub-segments each made from a bent steel plate.

For production reasons, the steel plates of the sub-segments usually have a width of approx. 3 m-5 m and a length of up to 24 m. The steel plates of the sub-segments are bent to form the supporting structure segments. In the prior art, to produce the sub-segments, the steel plates are bent along their length extension sub-segment, so that the sub-cylinder segments produced in this way, also known as pipe sections, have a height corresponding to the width of the steel plate. Consequently, if the steel plate has a width extension of 3 m, a sub-segment with a height extension of 3 m is produced by bending the steel plate along the length extension.

If a support structure is made of two or more support structure segments, the support structure segments are joined to each other at their longitudinal edges by means of circular weld seams. The foundation pile is assembled in such a way that adjoining support structure segments are respectively joined by means of a circular weld seam that the respective longitudinal axes of the support structure segments are collinear with each other.

Consequently, many weld seams with a large overall length are required to produce such a foundation pile, by which the manufacturing of the foundation pile becomes complex and cost-intensive. For example, to manufacture two support structure segments, each with a height of 3 m and a diameter of 7 m, and to connect them, weld seams with a total length of 28 m are required, namely two times 3 m weld seams each to connect the opposing side edges or material edges of the individual sub-segments and 22 m circumferential weld seams to connect the two support structure segments (or 34 m if the individual pipe sections are manufactured from two half shells).

BRIEF SUMMARY OF THE INVENTION

The subject matter was based on the object of reducing the number of weld seams and, in particular, reducing the duration of the welding operations.

This object is solved by a support structure according to claim 1.

If a support structure segment is manufactured from two or more sub-segments, the sub-segments are joined to one another at the longitudinal edges respectively by means of longitudinal weld seams. In this case, a number of longitudinal weld seams corresponding to the number of sub-segments is required for joining the sub-segments.

The sub-segments are formed from metal plates, in particular metal sheets. The metal plates may in particular be steel plates. In particular, the metal plates of at least two adjacent sub-segments have the same wall thickness. The metal plates of all sub-segments forming a support structure segment may have the same wall thickness. The metal plates of all support structure segments forming a support structure may have the same wall thickness. To optimize overall tonnage, adjacent pipe sections, or even sub-segments of a pipe section, may have different wall thicknesses.

Welding of the longitudinal edges of sub-segments opposing each other is usually carried out by means of a longitudinal weld, which can, for example, be designed as a butt weld on both sides in accordance with EN ISO 2553, Table 2, by means of submerged arc welding. In this process, the opposing longitudinal edges are for instance sharpened in order to produce a through-welded, double-sided butt weld in the subsequent welding process, so that the sheet edges abutting each other at their joining surfaces are joined over the entire wall thickness of the sheet of the sub-segments. Both the preparation of the opposing longitudinal edges and the establishment of a through-welded butt weld on both sides are time-consuming and cost-intensive.

It has now been recognized that the weld seams along the longitudinal edges do not have to be full seams throughout in order to achieve the mechanical properties required for the supporting structure. Rather, it is proposed that the respective welded joint in sections has a thickness that is less than a wall thickness of the metal plate (partial seam) and in sections has a thickness that is at least equal to the wall thickness of the metal plate (full seam). Thus, full seams and partial seams alternate along a longitudinal edge at the joining surface between two sub-segments.

The provision of a welded joint, in particular a weld seam, in particular in accordance with EN ISO 2553, Table 2, by means of submerged arc welding, in particular as a butt weld, of which the thickness is at least in sections less than the wall thickness of the metal plates (partial seam) offers the advantage that the process time and the heat input into the component can be reduced compared with solutions that require through-welding over the full wall thickness (full seam). Surprisingly, it has been shown that joining the joint surfaces in sub-areas is already sufficient to reliably keep the structural element in shape during the production process.

The thickness of the welded joint, in particular of a weld seam, is the extension of the welded joint along the wall thickness of the metal plate. In other words, both the wall thicknesses of the metal plate and the thickness of the welded joint are measured in a section transverse to the longitudinal axis, in particular orthogonal to an inner and/or outer shell surface of the support structure segment. The wall thickness of the support structure segment preferably corresponds to the thickness of the metal plate from which the sub-segments have been produced by forming.

The welded joint may extend over a partial length, two or more length sections, or the entire length of the sub-segment. A plurality of sub-segments welded together along their longitudinal axis to form a closed ring can be understood as a support structure segment or pipe section. The length of the support structure segment may be measured in parallel to the longitudinal axis of the sub-segments. In particular, a plurality of separate spot welds or one or more longitudinal weld seams may be provided in the region of a partial length, a length segment or along the entire length of the support structure segment.

The thickness d1 of the welded joint, measured in a section transverse to the longitudinal axis, whose thickness is less than the wall thickness of the metal plate, for example of the weld bead of a weld, can be less than or equal to $4/5$, or less than or equal to $1/2$, preferably less than or equal to $1/10$, more preferably less than or equal to $1/20$ of the wall thickness d2 of the supporting structure segment, and accordingly satisfy one of the rules $d1=0.8 \cdot d2$, $d1=0.5 \cdot d2$, preferably $d1=0.1 \cdot d2$, more preferably $d1=0.05 \cdot d2$. For example, the wall thickness of the support structure segment may be 100 mm, while the thickness of the weld joint, for example of the weld bead of a weld, is only 5 mm or less. In the present case, the thickness d1 may be, for example, the weld thickness s according to EN ISO 2553, Table 5.

The support structure is assembled from a plurality of appropriately formed support structure segments by joining support structure segments abutting at the end faces by means of a respective circumferential weld seam in such a way that the respective longitudinal axes of the support structure segments are collinear with one another. This circumferential weld is preferably a full weld.

The width extension of the respective metal plates from which the sub-segments can be produced by bending is usually 3 m-5 m, whereas the length dimension of the metal plates from which the sub-segments are formed may be up to 24 m.

The longitudinal edges of the respective sub-segments are arranged parallel to each other and consequently opposite of each other.

Preferably, a support structure segment comprises more than two, namely three, four, five, six, seven, eight or more interconnected sub-segments. In this respect, there are no restrictions with regard to the number of sub-segments. The number of sub-segments from which a support structure segment is made depends only on the diameter of the support structure and the respective length extension of the metal plates from which the sub-segments are formed.

Preferably, the sub-segments are manufactured as partial cylinder segments from the metal plate by bending along the width extension of the metal plate.

Transitions between different diameters of the pipe sections are thereby established by conical sub-segments. It is common that a support structure has more than one diameter along its vertical extent.

A bending radius of the sub-segments can be greater than or equal to the radius of the enclosing circular line. Thus, sub-segments of a pipe section forming the enclosing circular line may have different bend radii. This can increase the stability of the pipe section. The sub-segments may be bent along their end edges in a non-round, in particular in a elliptical, faceted, hypocycloid or epicycloid manner.

According to an embodiment, it is proposed that interconnected sub-segments are longitudinally offset from each other so that their end edges are axially spaced apart from each other (i.e., in the direction of the longitudinal axis of the support structure segment). Because of the longitudinal offset means the end edges are offset from one another. This produces a bond between the sub-segments which has increased stiffness due to the offset end edges. To terminate a support structure segment, it can have an end edge that runs in one plane if sub-segments with different longitudinal extents are joined together at their end edges. The bond can be formed as a half bond or quarter bond. If the end edges of the sub-segments are always in one plane, this can be referred to as a cross bond.

Two adjacent end edges can also be spaced apart from one another, so that a gap is formed between two sub-segments in the axial direction. This reduces the amount of material required for a pipe section.

According to an embodiment, it is proposed that two sub-segments are joined at mutually abutting joint surfaces along the end edges via a welded joint, the welded joint having a thickness which, at least in sections, is less than a wall thickness of the metal plate. The joint between sub-segments at mutually abutting end edges can be formed as a partial seam or full seam. Circumferentially adjacent end edges can be alternatingly formed as a partial seam or full seam, or all or some connections of end edges can be formed as a partial seam or full seam. A support structure segment can be formed circumferentially from sub-segments welded to one another at their longitudinal edges and, in its longitudinal extent, from at least two respective sub-segments which are joined to one another at their end edges by a partial seam. Two adjoining support structure segments can be welded together circumferentially at their abutting end edges by a full seam.

According to an embodiment example, it is proposed that two joining surfaces opposite of each other on a sub-segment are longitudinally offset from each other along the longitudinal edges with welded joints whose thickness is at least the wall thickness of the metal plate. This means that at a first longitudinal edge the full seams have a first distance from an end edge of the sub-segment and at the other longitudinal edge the full seams have a different distance from the end edge of the sub-segment. Circumferentially in a plane perpendicular to the longitudinal axis of the support structure segment, a full seam can thus be formed at one joint face and a partial seam at a next joint face. Also, two joining surfaces opposite each other on a sub-segment can be at the same level to each other in longitudinal extension along the longitudinal edges with welded joints, the thickness of which is at least the wall thickness of one of the adjacent sub-segments.

According to one embodiment, it is proposed that in a section of the joining surfaces with a welded joint whose thickness is less than the wall thickness of the metal plate, a retaining clip is arranged between the joining surfaces.

In addition, the joining surfaces can be connected to one another by at least one retaining clip. This can be an intermediate piece which can be fastened in a materially bonded or detachable manner in the region of the joining surfaces in order to connect the joining surfaces to one another. The retaining clip is used to hold the joined sub-segments in the desired shape for handling and joining operations and, if required, in the finished assembled state. After a support structure segment has been joined to another support structure segment at the end face, the retaining clip can be removed or remain on the component.

The retaining clip offers the advantage that a continuous longitudinal weld seam in the area of the joining surfaces can be foregone, while still ensuring the structural stability of the support structure segment. For example, the joining surfaces facing each other can be at a distance of one meter from each other, wherein this distance is bridged with the aid of the retaining clip in order to establish a connection between the joining surfaces. It is understood that two or more retaining clips may be provided between the joining surfaces.

The retaining clip can be fastened by a welded, screwed, bolt-riveted or magnetic connection in the region of a respective joining surface. The welded joint can then for example be carried out in the manner described above in such a way that no through-welding takes place, but rather the welding only makes up a part of the thickness and/or length of the mutually facing component sections to be joined.

According to an embodiment, it is proposed that the retaining clip is surrounded on two sides by the joining surfaces and/or terminates flush with the outer and/or inner lateral surface of at least one of the sub-segments. In this way, the retaining clip can be integrated into the wall geometry of the support structure segment without increasing the outer dimensions of the component or the required installation space of the support structure segment in the fully assembled state.

According to an embodiment, it is proposed that the retaining clip has at least one concave recess, in particular a fillet, wherein the recess transitions into the joining surfaces in particular essentially any without jumps, and/or has an essentially biconcave shape. In order to introduce as few tensile stresses as possible into adjacent or adjacently provided weld seams, the retaining clip can have at least one concave fillet, the fillet being able to merge into the joining surfaces, in particular, essentially without any jumps. The fillet can be used as a feedthrough for cables, lines, pipes or other retaining and/or connecting elements and thus serve as a through opening from the environment to the interior of the support structure segment and vice versa.

Alternatively or complementarily, the retaining clip may have a substantially biconcave shape. Such a biconcave shape is characterized in particular by two fillets facing away from each other, each of which can preferably merge into the opposing joining surfaces substantially without any jumps. In this way, a respective retaining clip arranged at a distance from the two end faces of a support structure segment can two-directionally reduce the transfer of tensile stresses into adjacent or neighboring weld seams. A biconcave retaining clip can therefore serve in particular to inhibit cracking or limit cracking between two adjacently arranged weld seams. A propagating crack of a weld seam can thus be interrupted or brought to a standstill in the region of the retaining clip without crack propagation beyond the retaining clip into adjacent weld seams.

According to an embodiment, it is proposed that the joining surfaces are spaced apart and/or abut each other at least in sections.

The joining surfaces may be "butted" and be directly adjacent to each other. In this case, the joining surfaces can be directly joined to one another in a simple manner with one or more longitudinal weld seams, wherein the longitudinal weld seams have alternating full seams and partial seams. Joining surfaces that contact one another also offer the advantage that the circumferential weld to an adjacent support structure segment can be welded through without interruption. In particular in submerged arc welding, a continuous weld seam is advantageous because the seam can be produced without the welding device having to be set down.

Also, at least one metal sheet can be arranged between the joining surfaces, wherein the metal sheet in particular extends substantially projecting into the pipe interior and/or has a substantially L-shaped cross section, wherein simple straight metal sheets are also conceivable. The sheet metal may be welded to the respective joining surfaces, so that the joining surfaces are indirectly connected to one another via the sheet metal. For example, longitudinal weld seams extending substantially parallel to one another can be provided, which enclose the sheet metal on two sides at least in sections and respectively connect it to one of the joining surfaces. The sheet metal can be used to hold and guide cables, lines or pipes and/or to fasten components of corrosion protection systems or maintenance equipment. The sheet metal may be arranged in the region of a full seam and/or a partial seam. The sheet itself may also be joined to the sub-segments by a full weld in a first region and a partial weld in a second region.

The welded joint may have been subjected to mechanical finishing to increase its strength. According to an advantageous further development, the welded joint has residual compressive stresses in a thickness cross section, wherein the residual compressive stresses have been generated in particular by cold forming and/or forging. The introduction of residual compressive stresses into the weld reduces the susceptibility to cracking under tensile load. When reference is made in the present context to a thickness cross section of the welded joint, in particular a weld seam, this refers to a section transverse, in particular orthogonal, to the longitudinal axis of the supporting structure. The residual compressive stresses in the area of the weld seam can be determined in a known manner and can be estimated, for example, by determining the surface hardness of the seam. Alternatively or additionally, the weld joint may have been relieved by drilling. The weld may include holes or recesses that are specifically located in areas that are susceptible to cracking due to tensile residual stresses. For example, the transition areas between a longitudinal weld and an adjacent circumferential weld can be relieved by a core bore, wherein part of the longitudinal weld, in particular its transition region to the base material, is removed at least in sections.

According to an embodiment, it is proposed that the support structure is a foundation structure, in particular a foundation pile, in particular for a wind power plant at sea, in particular a monopile, triplet, tripod or jacket. In particular, the support structure may be a tower structure of an offshore plant, in particular a wind power plant.

According to an embodiment, it is proposed that interconnected sub-segments forming a ring, the respective longitudinal edges of which are arranged parallel to each other, form a support structure segment, and that the support structure comprises at least two support structure segments, the longitudinal axes of which are substantially collinear with each other, and the end edges of which are connected to each other. The support structure segments formed from the sub-segments may be connected to one another along their end edges and thus form a support structure. In this case, the longitudinal axes of the respective support structure segments run collinearly to each other.

According to one embodiment, it is proposed that the abutting end edges of two support structure segments are at least partially connected circumferentially by a welded joint having a thickness at least equal to the wall thickness of the metal plate. Two support structure segments are thus joined together by a full weld.

According to an embodiment, it is proposed that the longitudinal edges of sub-segments of two support structure segments abutting each other at the end faces are angularly offset from each other. If two support structure segments are connected via their end faces, they can be angularly offset from one another in such a way that the joining surfaces between the respective sub-segments are not aligned with one another and lie in a line, but that the joining surfaces of two adjacent support structure segments are offset from one another.

It is also suggested that the position of the partial seam is flush with the outer or inner lateral surface of the sub-segment, centrally or at an asymmetrical distance from the lateral surfaces of the sub-segment.

BRIEF DESCRIPTION OF THE DRAWINGS

In the following, the subject matter is explained in more detail with reference to a drawing showing exemplary embodiments. In the drawing show:

FIG. 1b a bent metal plate according to FIG. 1a;

FIG. 7b the weld seam between the sub-segments and the retaining clip according to FIG. 7a.

DETAILED DESCRIPTION OF THE INVENTION

Figure 1A:
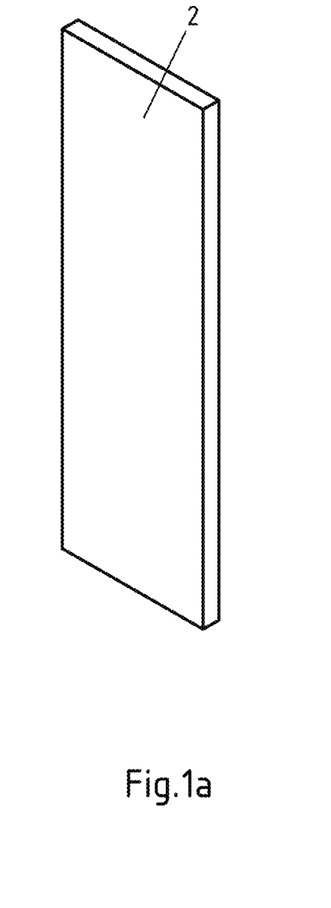
FIG. 1a A metal plate of a sub-segment.
Figure 1B:
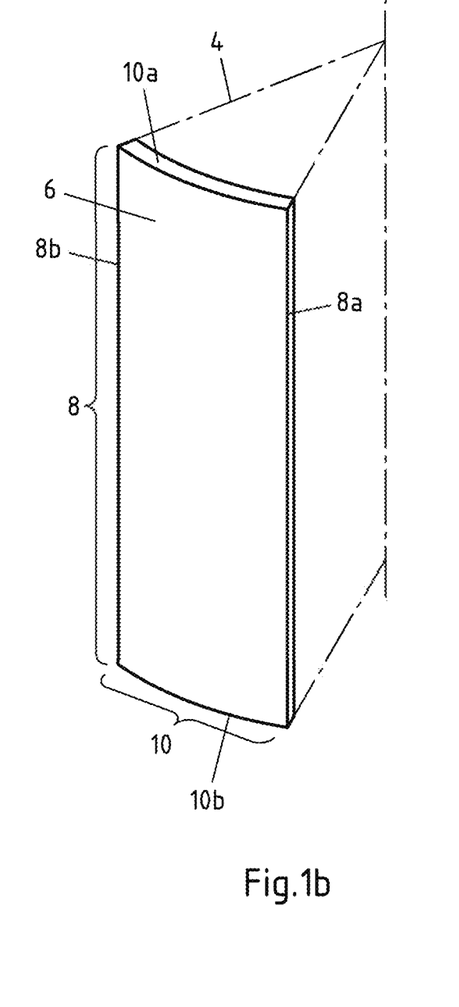

FIG. 1a shows a metal plate 2 formed, for example, from a metal sheet, in particular from a steel sheet. The metal plate 2 is bent along a bending radius 4, as shown in FIG. 1b. The bending radius 4 corresponds in particular to a radius of a support structure segment, consequently to a radius of a support structure of a tube-shaped foundation pile, as will be described below. However, the bending radius can also be larger or smaller than the enclosing radius of the sub-segment.

The bent metal plate 2 forms a sub-segment 6. The sub-segment 6 has a length extension 8 as well as a width extension 10. In the length extension 8, two longitudinal edges 8a, b are opposite each other and in the width extension 10, two end edges 10a, b are opposite each other. The metal plate 2 of the sub-segment 6 is preferably rectangular.

In order to form a supporting structure, the sub-segments 6 are joined to each other along their longitudinal edges 8a, b. The narrow surface adjacent to the longitudinal edges 8a, b can be understood as the longitudinal joining surface between two sub-segments 6. The narrow surface abutting the end edges 10a, b can be understood as an end-side joining surface between two sub-segments 6.

Figure 2:
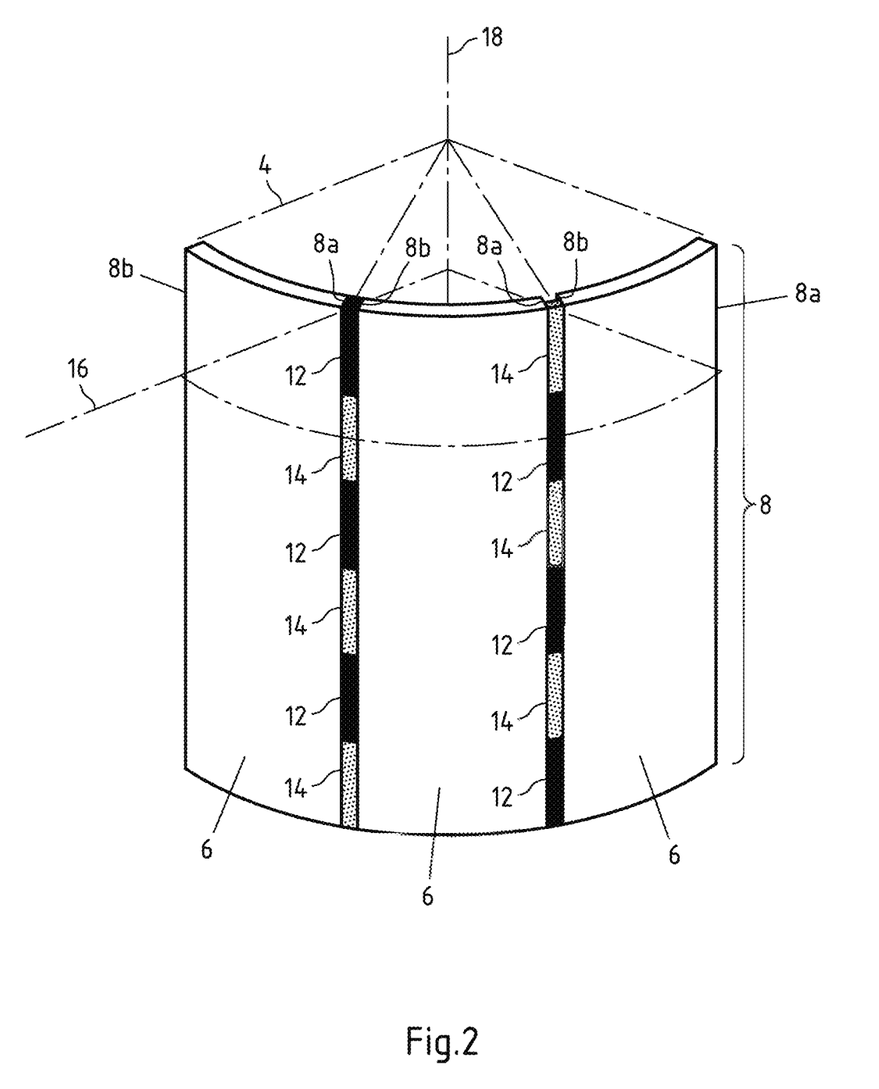
FIG. 2 sub-segments connected to each other along the longitudinal edges.

For joining, two sub-segments 6 with longitudinal edges 8a, b or their longitudinal joining surfaces are placed against each other respectively, as can be seen in FIG. 2. Subsequently, the sub-segments 6 are welded, whereby the weld seam can be formed in parts from full seams 12 and in parts from partial seams 14 or also without a seam. FIG. 2 shows that adjacent longitudinal edges 8a, 8b are welded together by means of the full seam 12 and the partial seam 14. Along the length 8, full seams 12 and partial seams 14 alternate.

FIG. 2 also shows that it is possible for the full seams 12 and thus the partial seams 14 to be offset to a plane 16 perpendicular to a longitudinal axis 18. That is, a sub-segment 6 may have a full seam 12 at a first longitudinal edge 8a, whereas in the plane 16 on the opposite side of the sub-segment 6 there may be a partial seam 14 at the longitudinal edge 8b. In other words, the full seams 12 of opposing joining surfaces on longitudinal edges 8a, b are offset from each other along a longitudinal axis 18.

In a further embodiment, full seams and partial seams lie circumferentially largely in one plane.

Figure 3A:
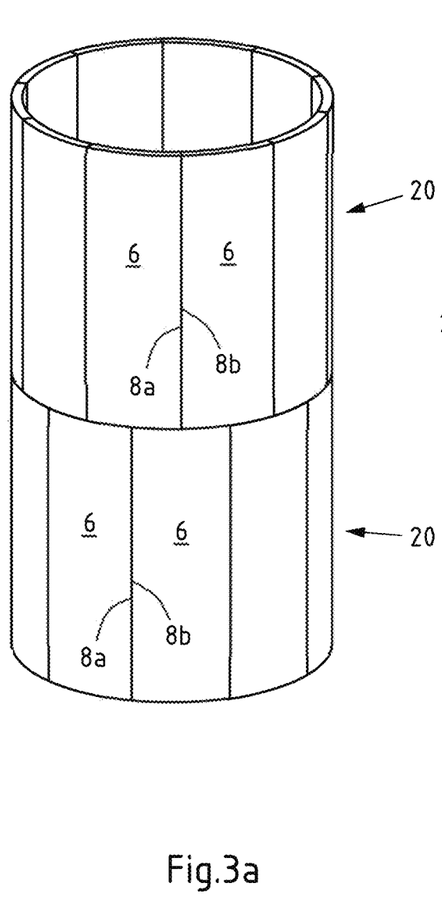
FIG. 3a two support structure segments connected to each other along their end edges.

Due to their bending around the bending radius 4, the welded-together sub-segments 6 are joined together to form a tube-shaped support structure segment, as shown in FIG. 3a.

Sub-segments 6 joined together respectively along longitudinal edges 8a, b together form a support structure segment 20. Two support structure segments 20 are joined together at their end edges by a full seam 22. As can be seen in FIG. 3a, the longitudinal edges 8a, b of sub-segments 6 of two abutting support structure segments 20 are angularly offset relative to each other. As a result, the longitudinal seam along the joining surface at the longitudinal edges 8a, b extends only across one support structure segment 20, and in the next support structure segment 20 adjacent thereto, a longitudinal seam along the joining surface at the longitudinal edges 8a, b is angularly offset with respect thereto.

Figure 3B:
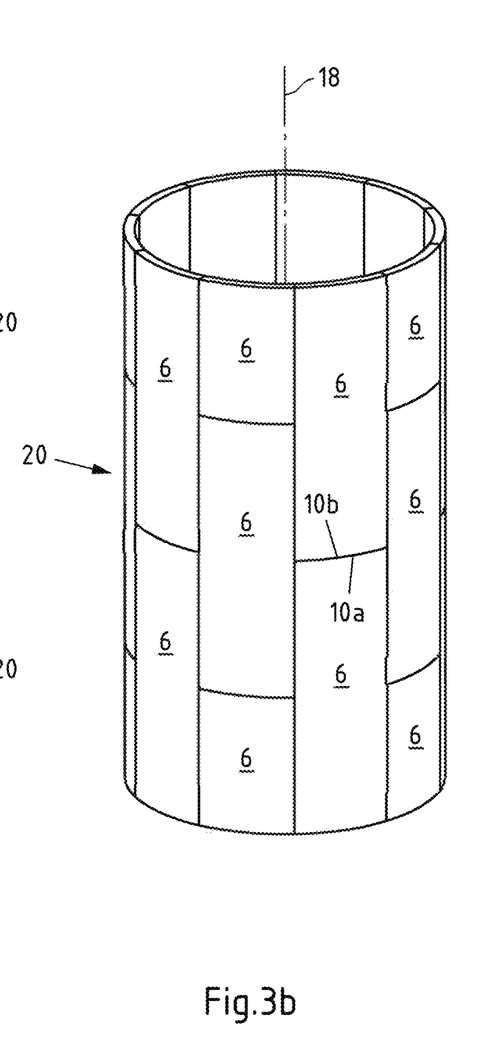
FIG. 3b a support structure segment with sub-segments arranged to each other with offset.

As shown in FIG. 3b, a support structure segment 20 can be formed from sub-segments 6, which are offset against one another with their end edges 10a, b along the longitudinal axis 18. In this case, the abutting end edges 10a, b can be joined to each other with a partial seam 14. The joining surfaces along the longitudinal edges 8a, b can be formed with full seams 12 and partial seams 14 alternating each other.

Figure 4:
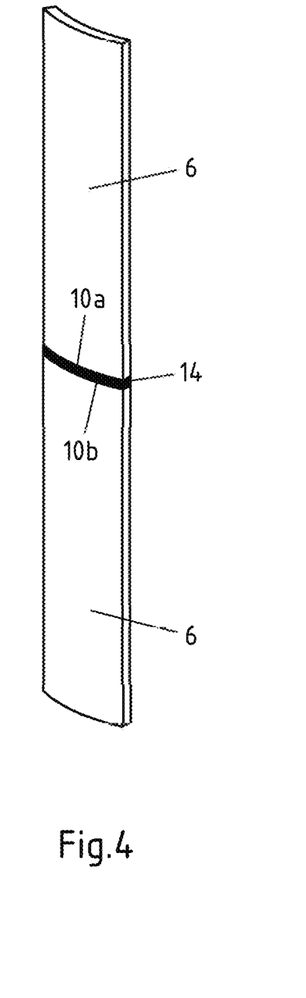
FIG. 4 a connection of two sub-segments along an end edge.

FIG. 4 shows two sub-segments 6 which are joined together at their end edge 10a, b by a partial seam 14.

Figure 5A:
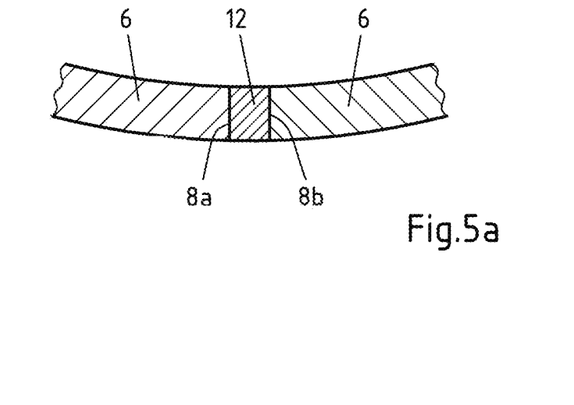
FIG. 5a, b a full seam and a partial seam.
Figure 5B:
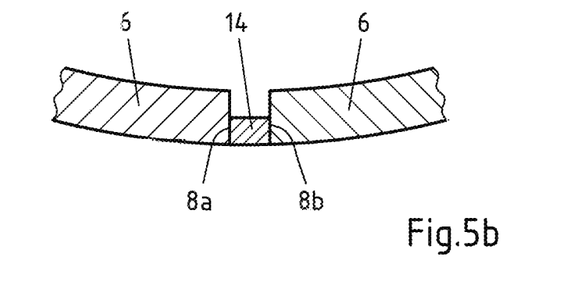

FIG. 5a shows a full seam 12, which extends across the entire material thickness of the sub-segments 6 at their longitudinal edges 8a, b. FIG. 5b shows a partial seam which extends only over parts of the material thickness of the sub-segments 6. The position of the partial seam can be flush with the outside, with the inside of the lateral surfaces of the sub-segment, in the center or at an asymmetrical distance from the lateral surfaces.

Figure 7A:
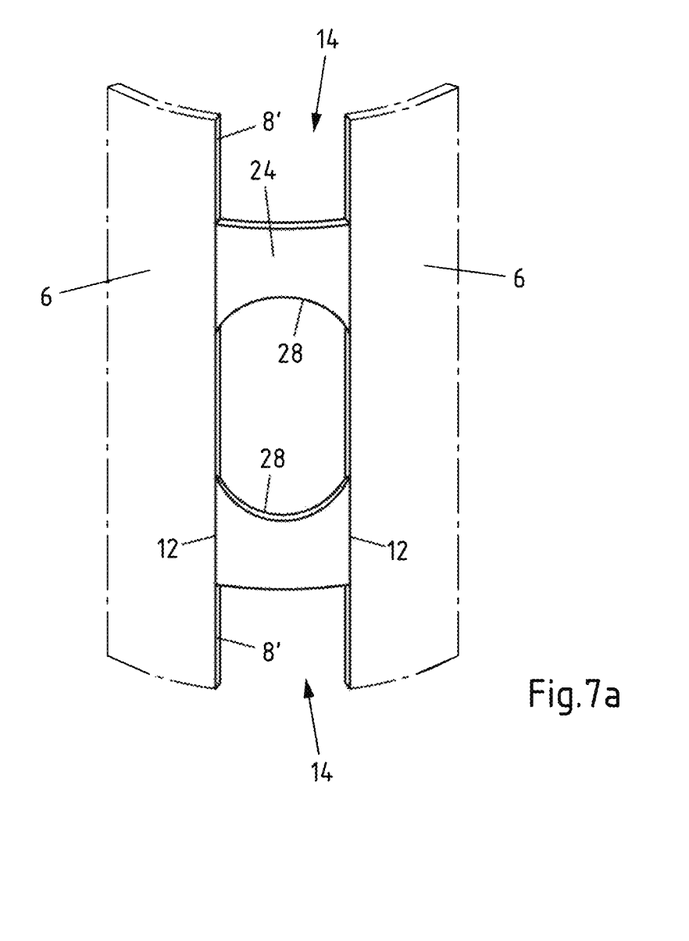
FIG. 7a a weld seam with a retaining clip.
Figure 7B:
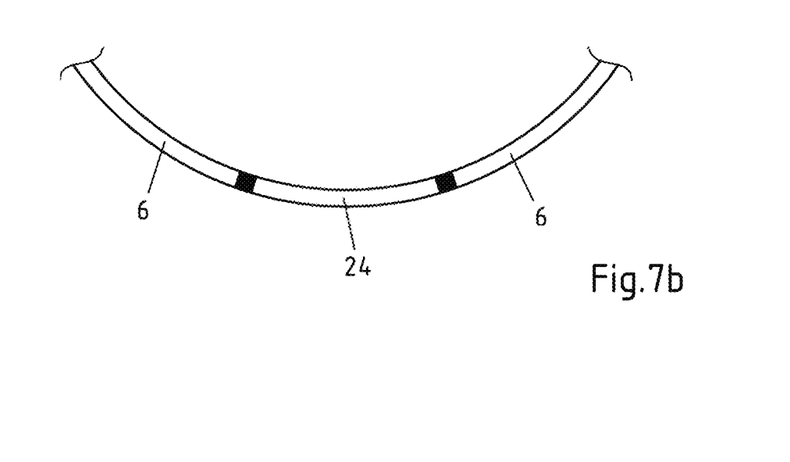

The joint of the joining surfaces 18 of the segment 14 may have a retaining clip 24 (FIG. 7a). The retaining clip 24 is enclosed on two sides by the seams 12 and closes flush with the inner lateral surface (not shown) and outer lateral surface of the sub-segment 6. The retaining clip 24 is welded to the longitudinal edges 8a, b, in particular the longitudinal joining surfaces 8' of the sub-segment 6. This is shown in FIG. 7b. There it can be seen that the retaining clip 24 is connected to the adjacent joining surfaces 8' by a full seam 12.

The retaining clip 24 has two concave fillets 28, which extend substantially without any jump into the longitudinal joining surfaces 8', so that in particular no step or shoulder is provided in the transition from a fillet 28 towards the mutually facing joining surfaces 8'. The retaining clip 24 has a substantially biconcave shape.

Due to the biconcave shape of the retaining clip 24 adjacent or neighboring weld seams 14 are relieved, so that in particular the formation of cracks in the region of the weld seams 14 due to tensile stresses can be counteracted. Further, the retaining clip 24 can serve as a crack limiter. In the event of failure of one of the weld seams 14 of the sub-segment 6, a crack thus does not propagate along the entire length of the segment 14, but is interrupted in the region of the retaining clip 24.

In the present case, the retaining clip 24 is permanently integrated into the supporting structure. According to alternative embodiments, a retaining clip 24 can also be removed after the segments 6 have been connected to each other at the end faces. In this way, a larger through opening can be created to attach or pass cables or other attachments through the pipe wall, reduce weight, or save costs by reusing the retaining clip.

In order to increase the strength of the weld seams 12, 14, in particular against tensile loads, residual compressive stresses have been introduced into the weld seams 12, 14 by cold forming. Alternatively or additionally, residual compressive stresses can also be introduced into the weld seams by forging.

Figure 6:
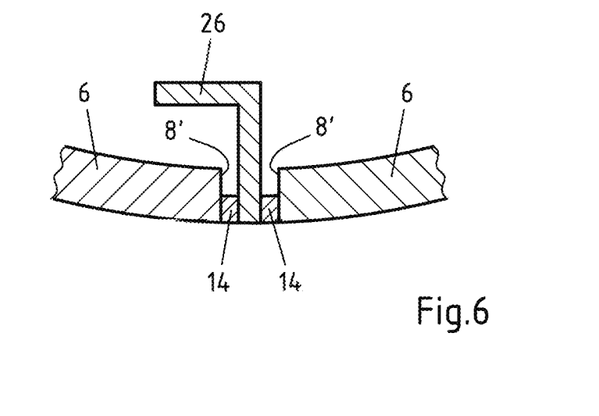
FIG. 6 a partial seam with an L-shaped plate.

A plate 26 can also be introduced between the joining surfaces 8', which is in particular L-shaped. The plate 26 can be provided in particular in the region of a part seam 14, as shown in FIG. 6.

LIST OF REFERENCE SIGNS

2 Metal plate
4 Bending radius
6 Sub-segment
8 Longitudinal extension
8a,b Longitudinal edge
8' Joining surface
10 Width extension
10a,b Face edge
12 Full seam
14 Partial seam
16 Plane
18 Longitudinal axis
20 Support structure segment
24 Retaining clip
26 Plate
28 Fillet All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Support structure, in particular for a wind power plant, with
   at least two sub-segments at least partially connected to one another which are respectively formed from a metal plate having a longitudinal extension and a width extension, wherein the longitudinal extension is greater than the width extension, and wherein
   the sub-segments respectively have longitudinal edges extending in the longitudinal extension and are joined to one another at mutually abutting joint surfaces along the longitudinal edges by means of a respective welded joint,
   the sub-segments each have end edges extending in the width extension, wherein the sub-segments are bent along their end edges respectively,
wherein
   the respective welded joint in sections has a thickness which is smaller than a wall thickness of the metal plate and in sections has a thickness which is at least equal to the wall thickness of the metal plate.

2. Support structure according to claim 1,
wherein
   a bending radius of the sub-segments is greater than, smaller than or equal to a radius of an enclosing circular line and/or
   the sub-segments are bent along their end edges in a non-round, in particular in an elliptical, faceted, hypocycloidal or epicycloidal manner.

3. Support structure according to claim 1,
wherein
   interconnected sub-segments are offset in longitudinal extension relative to one another so that their end edges are axially spaced apart from one another.

4. Support structure according to claim 1,
wherein
   interconnected sub-segments are offset in longitudinal extension relative to one another, so that their end edges are axially spaced apart from one another, and at least one sub-segment is spaced apart from the adjacent sub-segment in the longitudinal direction, so that a gap is formed as a result.

5. Support structure according to claim 1,
wherein
   two sub-segments are joined at mutually abutting joint surfaces along the end edges by means of a welded joint, wherein the welded joint has a thickness which, at least in sections, is less than a wall thickness of the metal plate.

6. Support structure according to claim 1,
wherein
   the two joining surfaces on a sub-segment opposite to one another are offset relative to one another in longitudinal extension along the longitudinal edges with welded joints whose thickness is at least the wall thickness of one of the adjacent metal plates.

7. Support structure according to claim 1, wherein
two joining surfaces opposite to one another on a sub-segment along the longitudinal edges with welded joints, the thickness of which has at least the wall thickness of one of the adjacent sub-segments, are at the same height relative to one another in longitudinal extension.

8. Support structure according to claim 1, wherein
in a section of the joining surfaces with a welded joint, of which the thickness is less than the wall thickness of the metal plate, a retaining clip is arranged between the joining surfaces.

9. Support structure according to claim 8, wherein
the retaining clip is enclosed on two sides by the joining surfaces and/or terminates flush with the outer and/or inner lateral surface of at least one of the sub-segments.

10. Support structure according to claim 8, wherein
the retaining clip has at least one concave recess, in particular a fillet, wherein the recess merges into the joining surfaces in particular essentially without any jump, and/or has an essentially biconcave shape.

11. Support structure according to claim 1, wherein
the joint surfaces, at least in sections, have a gap to one another and/or abut one another and/or at least one metal sheet is arranged between the joining surfaces, the metal sheet in particular extending in a substantially projecting manner into the tube interior and/or having a substantially L-shaped cross section.

12. Support structure according to claim 1, wherein
the support structure is a foundation structure, in particular a foundation pile, in particular for a wind power plant at sea, in particular a monopile, triplet, tripod or jacket.

13. Support structure according to claim 1, wherein
the support structure is a tower structure, in particular for a wind power plant on land or at sea.

14. Support structure according to claim 1, wherein
the sub-segment is a partial cylinder segment.

15. Support structure according to claim 1, wherein
interconnected sub-segments forming a ring, of which the respective longitudinal edges are arranged parallel to each other, form a support structure segment, and that the support structure comprises at least two support structure segments, of which the longitudinal axes are substantially collinear with each other, and of which the end edges are interconnected.

16. Support structure according to claim 1, wherein
abutting end edges of two support structure segments are connected at least partially circumferentially by a welded joint which has a thickness which is at least equal to the wall thickness of the metal plate.

17. Support structure according to claim 1, wherein
the longitudinal edges of sub-segments of two support structure segments abutting each other at the end faces are angularly offset relative to each other.

18. Support structure according to claim 1, wherein
the respective sub-segments each define a longitudinal axis in their longitudinal extension, and that the longitudinal axes of the respective sub-segments run parallel to a longitudinal axis of the support structure.

19. Support structure according to claim 1, wherein
bending radii of the respective sub-segments correspond to a radius of curvature of the support structure.

20. Support structure according to claim 1, wherein
a position of a partial seam is flush with the outer or inner lateral surface of the sub-segment, central or at an asymmetrical distance from the lateral surfaces of the sub-segment.

* * * * *